June 24, 1941.                H. K. FOSTER                2,247,230
                             COOKING UTENSIL
                          Filed Oct. 2, 1940            2 Sheets-Sheet 1

INVENTOR.
HOYT K. FOSTER.
BY *M. Theodore Simmons*
ATTORNEY.

June 24, 1941.　　H. K. FOSTER　　2,247,230
COOKING UTENSIL
Filed Oct. 2, 1940　　2 Sheets-Sheet 2
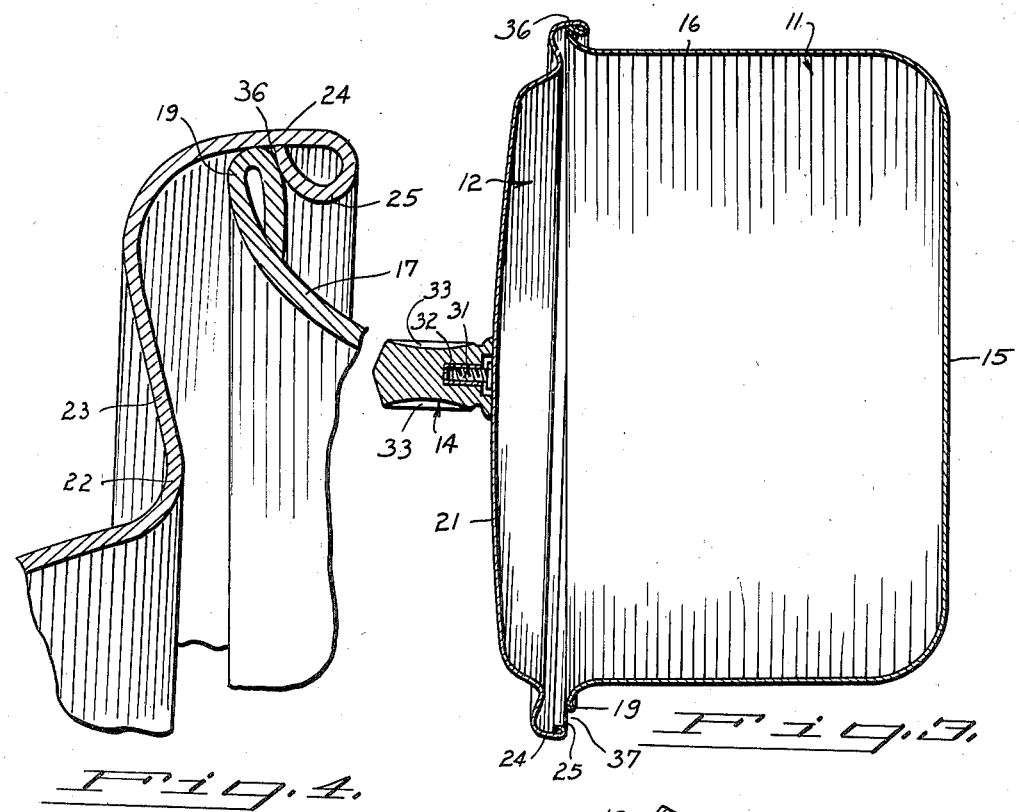
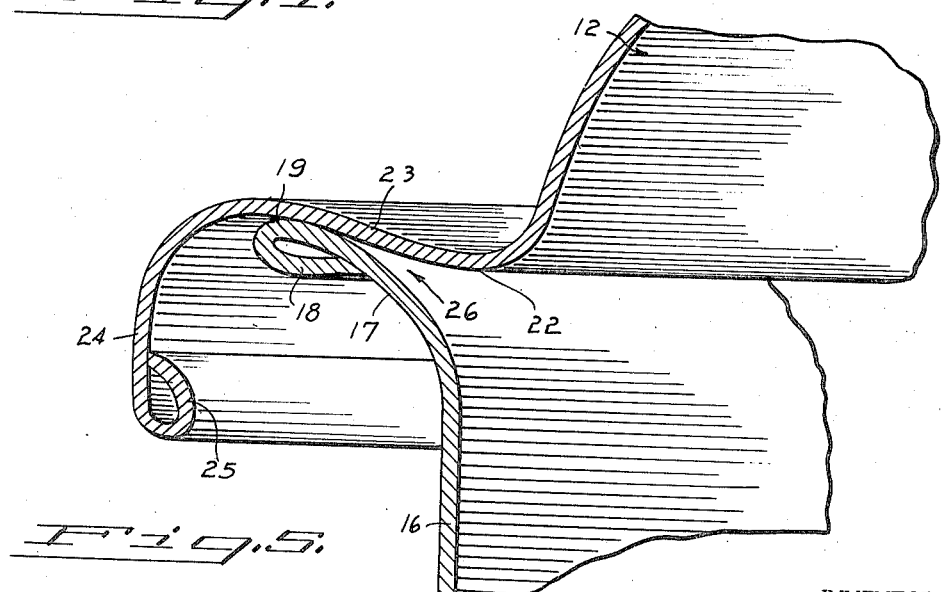
INVENTOR.
HOYT K. FOSTER.
BY
ATTORNEY.

Patented June 24, 1941

2,247,230

UNITED STATES PATENT OFFICE 2,247,230

COOKING UTENSIL

Hoyt K. Foster, Hollis, N. Y., assignor to S. W. Farber, Inc., Brooklyn, N. Y., a corporation of New York Application October 2, 1940, Serial No. 359,304

6 Claims. (Cl. 53—8)

My invention relates to cooking utensils, and more particularly to such as are formed of sheet metal, such as stainless steel.

Heretofore, it has not been deemed possible to do so-called waterless cooking in utensils formed of sheet metal without providing special constructions for sealing the joint between the cover and pot and without providing special valve arrangements for venting the steam from within the pot. These special constructions have greatly increased the cost of manufacture of the utensils, as well as requiring special attention on the part of the user.

A further disadvantage with cooking utensils of all kinds, whether for waterless cooking or not, has been the difficulty of draining or pouring off the water remaining after cooking. One of the difficulties is that the steam from the water being poured off rises around the pot, making it difficult to hold the cover on the pot while pouring, and frequently results in burns of the hands.

Various devices have been proposed and tried in the art for the purpose of retaining the cover in position on the pot while pouring and for keeping the hands away from the vicinity of the pot where the steam is. All of these arrangements have had one or more of the faults that they are complicated to use, that they add to the difficulty of, or interfere with the handling of the utensil in its normal uses, that they are not reliable, or that they are easily damaged and rendered useless, and of course, all such arrangements have added considerably to the cost of manufacturing of the utensils. In other words, they are not practical commercially.

In one of its phases my invention relates to a new and improved construction by which so-called waterless cooking can be done in a utensil formed of sheet metal without the necessity of special valves, etc.

In another of its phases my invention relates to a new and improved construction by which the cover inherently remains on the pot when the same is tilted to pour off the water used during cooking.

In still another phase my invention relates to the provision of a new and improved construction of knob for the cover to be used while pouring off the water used during cooking so as to minimize the dangers of scalding of the hands from steam arising from the water being poured off.

Another object of my invention is to provide a construction embodying any and all of the foregoing features which is exceedingly simple and economical to manufacture, especially in mass production, while at the same time improving the usefulness of the utensil.

Other and further objects and advantages of my invention will be apparent from this specification taken in conjunction with the accompanying drawings, in which—

Fig. 3 is a central vertical section of the pot and cover when in the tilted or pouring position shown in Fig. 1.

Fig. 4 is a fragmentary view in enlarged detail of the cover and pot showing particularly the relationship of the parts about the upper edge when the utensil is in the position shown in Fig. 3.

Fig. 5 is a fragmentary view in enlarged detail of the cover and pot showing particularly the relationship of the same when the utensil is in the cooking position.

Figure 1:
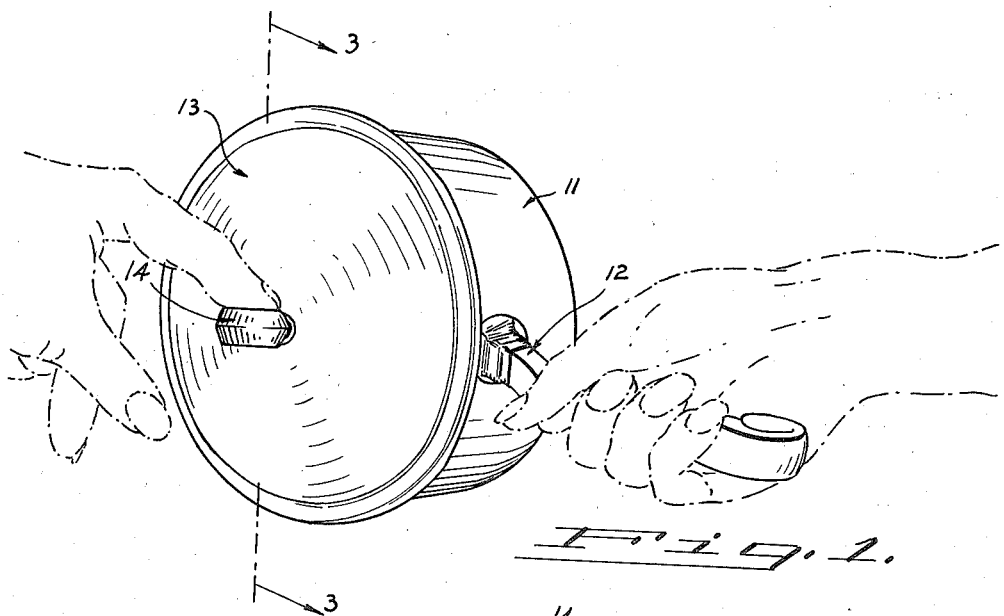
Figure 1 is a perspective view of the cooking utensil of my invention, shown in tilted or pouring position.

Referring to the embodiment shown in the drawings, the utensil comprises a pot 11 having a carrying handle 12 projecting from one side thereof, and a cover 13 which has a knob 14 extending upwardly therefrom.

The pot 11 has a bottom 15 and upright sides 16 formed from one sheet of metal, such as stainless steel having a thickness of about .025 inch. Referring to Fig. 5, the upper end of the side walls is flared outwardly at an obtuse angle, as indicated at 17, and the edge is bent over and back upon the flared portion, as shown at 18, to form a substantially flat bead 19 projecting outwardly and upwardly. It will be remembered that in this figure of the drawings the parts are shown considerably enlarged.

Figure 2:
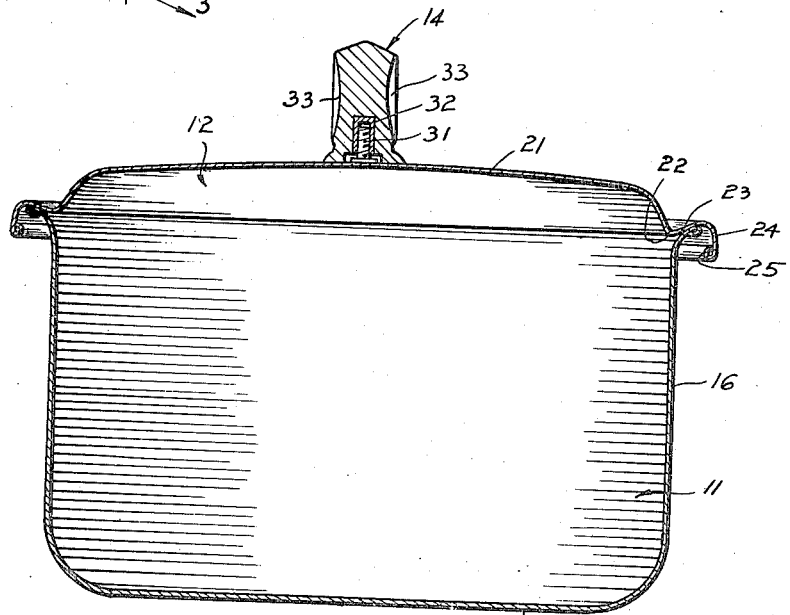
Fig. 2 is a central vertical section of the pot and cover when in upright or cooking position.

The cover 12, referring to Figs. 2 and 5, is also formed from sheet metal, such as stainless steel having a thickness of about .020 inch. It has a somewhat dome shaped center portion 21, of slightly less diameter than the interior diameter of the pot and terminating below the upper edge of the pot, as indicated at 22. It will be noted that the plane of the edge 22 intersects the flange 17 of the pot. Extending outwardly and upwardly from the edge 22 is a flange 23 which overlies and extends beyond the flared portion 17 and the bead 19, and rests upon the same when the utensil is in cooking position. The cover is imperforate.

The projecting end of the flange 23 is turned downwardly in a depending lip 24, which extends a substantial distance below the bead 19 of the pot, and the edge of the lip 24 is curled inwardly and upwardly to form a closed internal bead 25. The flange 23 extends outwardly beyond the bead 19 a sufficient distance so that the bead 25 of the cover readily clears the bead 19 as the cover is removed from the pot from time to time, without any danger or likelihood of the two beads catching upon each other sufficiently to pull the cover out of the hand. The construction of the beads also facilitates this. Also the use of beads on the cover and pot serve to reinforce these edges against distortion and damages.

The arrangement of the flange 23 to be tapering inwardly of the bead 19 and terminating below the same on the inside of the pot 16 serves to substantially center the cover with respect to the pot. Any off center placing of the cover where the lip 24 encloses the bead 19 of the pot will be corrected by gravity when the cover is released from the fingers so that at all times the cover is properly positioned with respect to the pot 16 and the flange 17 thereof. This arrangement also insures that condensation on the inside of the cover will find its way back into the pot.

It will also be noticed that the inclinations of the flange 17 of the pot and the flange 23 of the cover are such as to form a small acute angle therebetween as indicated at 26, terminating at the place where the inclined surfaces of the flanges contact each other over a distance corresponding substantially to the width of the bead 19. This is not an absolute steam-tight seal, but it is a substantial seal for steam, and an absolute seal for water of condensation.

In doing what is termed waterless cooking, the vegetable is placed in the pot 16 and the cover is applied. As is known, in some instances, a very small quantity of water is also used. In either event, when sufficient heat has been generated inside the pot to produce steam, some steam does escape around the edge of the pot and from beneath the cover, and as is known, the heat is then substantially reduced in volume, and the cooking is completed under the lowered heat. It is not necessary with this construction to provide any steam vent because if there is any additional excess steam formed during the cooking under the lowered heat, it will escape around the edge of the pot and between the flange 17 and the cover, which of course, is a signal to the user to further reduce the heat.

Continuing with the construction of the cover, and its use when pouring water from the utensil, the knob 14, made of heat insulating material, is mounted upon a screw 31 which is spot welded to the top of the cover at its center and engages a screw threaded sleeve 32 which is mounted in the knob at the bottom. The knob is provided on each of its sides with a large concavity 33. When the utensil is tilted for pouring, it is in the position shown in Figs. 1 and 3, in which the pot is tilted at an angle above the horizontal, so that all water in the pot will flow out of the pot. When the utensil is thus tilted, the cover will slide by gravity until the thin flat bead 19 engages the depending lip 24 at the portion of the pot that is then at the top, as indicated at 36 in Fig. 3. This will leave an enlarged space between the beads 19 and 25, as indicated at 37, through which all water will easily and readily flow out of the pot. In this position, the depending lip 24 will deflect the water rearwardly or toward the position of the bottom of the pot. At the same time the opening 37 is not large enough to allow even the smallest vegetable to go out through the opening.

When the pot is tilted to the pouring position, the cover will also swing by gravity away from its seat upon the flange of the pot, so that the lips are substantially in alignment at the bottom, as shown in Fig. 3. Even in this position where the pot is tilted beyond the horizontal, the cover still will not slip off the pot because of the engagement of the flat bead in the deep recess behind the bead 25, and also in part due to the frictional engagement of the two beads. To insure that the weight of the vegetable in the utensil does not force the cover off the pot during the pouring operation, it is only necessary to place one finger on the knob 14, as shown in Fig. 1, and to exert a slight downward pressure to keep the beads 19 and 25 interlocked. As will be appreciated, all of the hand except the finger on the knob 14 is a substantial way from the utensil, so that there is no possibility of burning. Inasmuch as the water is deflected away from the cover during the pouring operation, the steam escaping with the water will not rise to any substantial extent around the front of the cover, and not in any sufficient quantity to cause any danger of burning of the finger on the knob 14. By placing the finger in one of the enlarged concavities 33 of the knob, which is designed to fit the end of the finger, the user is able automatically to keep the cover in the position shown in Fig. 3, against any weight on the inside of the cover, and at the same time there is no tendency to push the cover inwardly against the flange of the pot so as to close the opening through which the water is flowing off.

In many cases, it will not be necessary to place the finger upon the knob 14 at all, since the interlocking of the beads is sufficient to keep the cover in place during the pouring operation, but in the other cases the arrangement of the knob as shown is highly desirable.

Thus, there is provided in a simple construction a utensil having all of the advantages recited above. It will be appreciated that different features of the construction may be used separately where it is not intended to incorporate all of these features in one construction.

Modifications may be made in the arrangement and location of parts within the spirit and scope of my invention, and such modifications are intended to be covered by the appended claims.

I claim:

1. A cooking utensil comprising a pot having a bottom and sides formed of sheet metal, the upper portion of the sides terminating in an outward and upward flare and an outer thin flat bead, and a cover for said pot formed of sheet metal and having an outer depending portion extending below the bead of the flared portion and provided with a deep inturned bead arranged to interlock with the bead of the pot when the utensil is tilted into pouring position.

2. A cooking utensil comprising a pot having a bottom and sides formed of sheet metal, the upper portion of the sides terminating in an outward flare and the edge of the flared portion being bent upon itself and extending beneath the flared portion, and a cover for said pot formed of sheet metal and having an outer depending portion extending below the edges of the flared portion and provided with an inturned bead arranged to interlock with the edge of the flared portion of the pot when the utensil is tilted into pouring position.

3. A cooking utensil comprising a pot having a bottom and sides formed of sheet metal, the upper portion of the sides terminating in an outwardly and upwardly flared portion, and a cover for the pot formed of sheet metal and having a central dome shaped portion of less diameter than the pot and terminating below the top of the flared portion, and a flange upwardly inclined from the terminus of the dome and overlying the top of the flared portion so as to be partially co-extensive therewith and also forming an acute angle with the flared portion on the interior of the pot.

4. A cooking utensil comprising a pot having a bottom and sides formed of sheet metal, the upper portion of the sides terminating in an outwardly and upwardly flared portion, and a cover for the pot formed of sheet metal and having an imperforate central portion of less diameter than the pot and terminating below the top of the flared portion, and an imperforate flange upwardly inclined from the terminus of the central portion and overlying the top of the flared portion so as to be partially co-extensive therewith and also forming an acute angle with the flared portion on the interior of the pot.

5. A cooking utensil comprising a pot having a bottom and sides formed of sheet metal, the upper portion of the sides having an outwardly and upwardly flared portion terminating in a bead, and a cover for the pot formed of sheet metal and having a central dome shaped portion of less diameter than the pot and terminating below the top of the flared portion, a flange upwardly inclined from the terminus of the dome which overlies the top of the flared portion so as to be partially co-extensive therewith and extends beyond the bead of the pot, and a lip depending from the flange and having an inwardly projecting bead below the bead of the pot.

6. A cooking utensil comprising a pot having a bottom and sides formed of sheet metal, the upper portion of the sides having an outwardly and upwardly flared portion terminating in a bead, and a cover for the pot formed of sheet metal and having a central dome shaped portion of less diameter than the pot and terminating below the top of the flared portion, a flange upwardly inclined from the terminus of the dome which overlies the top of the flared portion so as to be partially co-extensive therewith and extends beyond the bead of the pot, and a knob on top of the cover arranged with a cavity to be engaged by the finger when the pot is tilted into pouring position.

HOYT K. FOSTER.